Oct. 19, 1943.                M. W. LOWE                2,332,093
                  CONVEYER FOR FRUITS AND VEGETABLES
                     Filed April 1, 1940         2 Sheets-Sheet 1
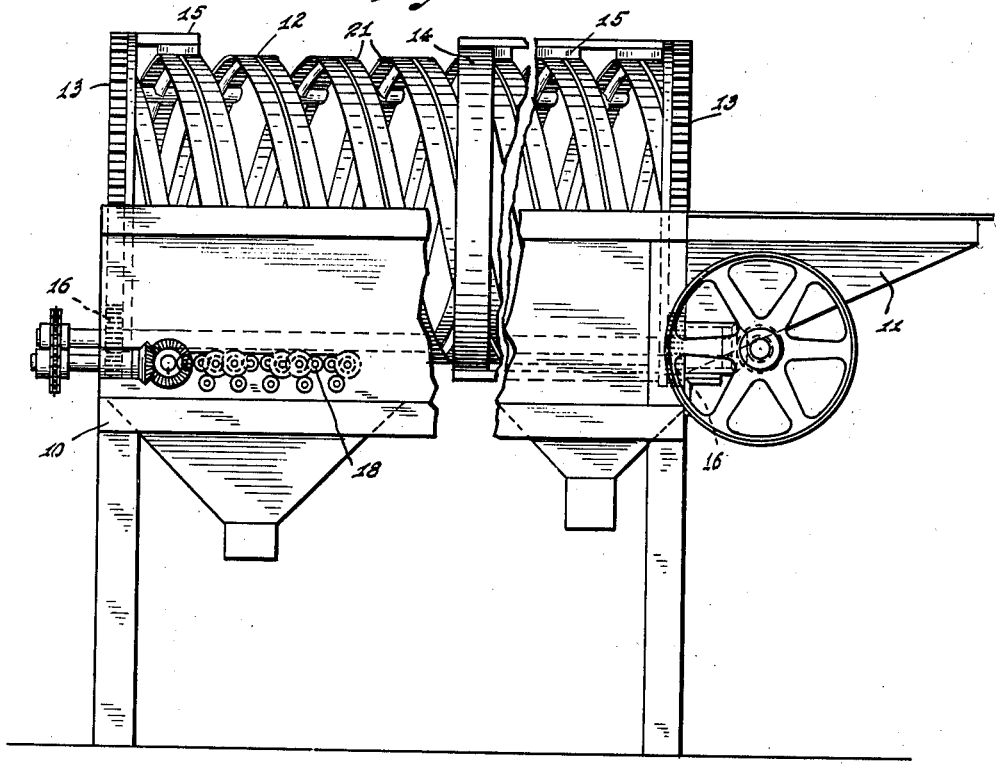
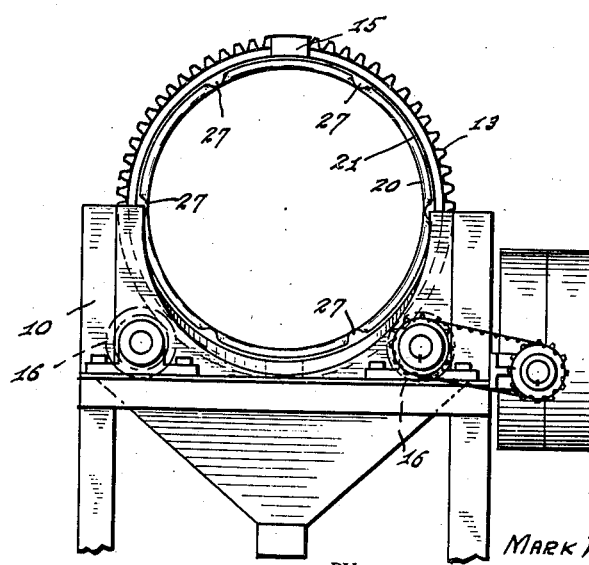
INVENTOR.
MARK W. LOWE,
BY
ATTORNEYS.

Oct. 19, 1943.　　　　M. W. LOWE　　　　2,332,093
CONVEYER FOR FRUITS AND VEGETABLES
Filed April 1, 1940　　　　2 Sheets-Sheet 2
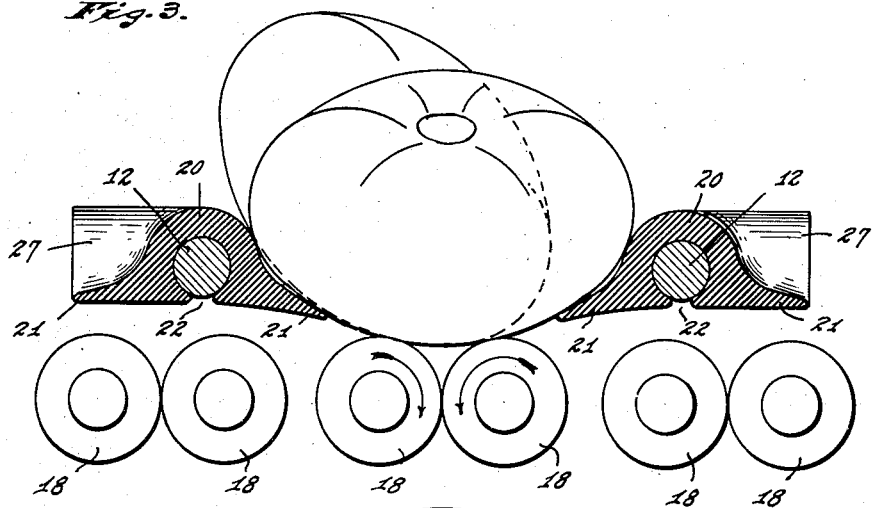
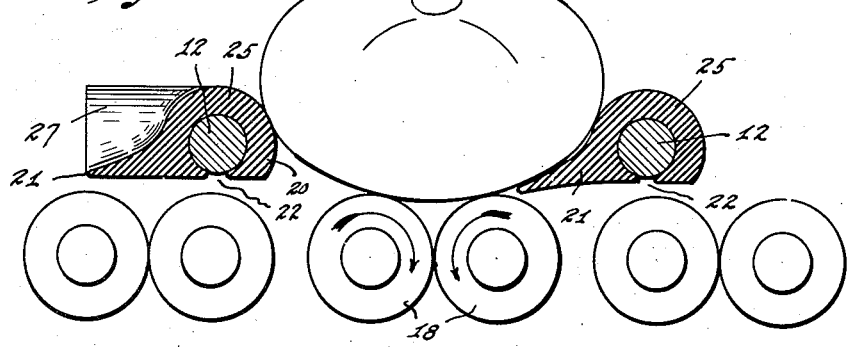
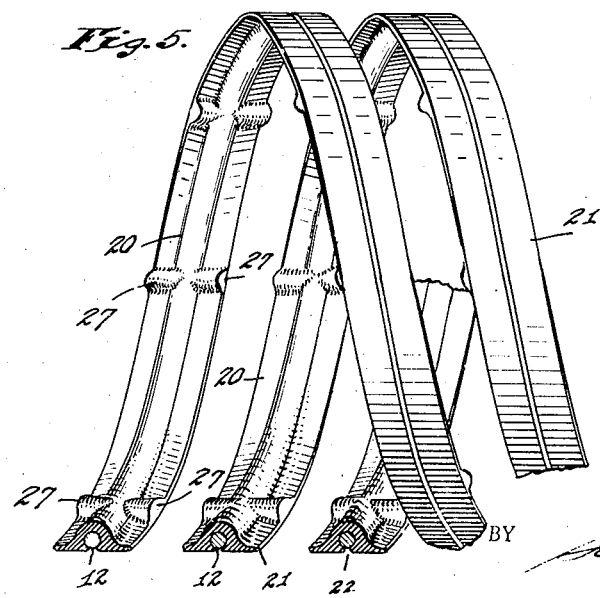
INVENTOR.
MARK W. LOWE,
BY
ATTORNEYS.

Patented Oct. 19, 1943

2,332,093

UNITED STATES PATENT OFFICE 2,332,093

CONVEYER FOR FRUITS AND VEGETABLES

Mark W. Lowe, Connersville, Ind.

Application April 1, 1940, Serial No. 327,106

7 Claims. (Cl. 146—43)

My invention relates to helical conveyers, and more particularly to conveyers suitable for use in causing the movement of fruit and vegetables through cleaning or peeling machines. My invention is particularly suitable for use in a tomato-peeling machine, and will be so described herein, but it is to be understood that the invention may be employed in other types of machines.

It has heretofore been proposed, as in United States Patent No. 1,581,071, issued April 13, 1926, to H. W. Lowe, to form a helical conveyer from one or more rods wound into helical form and supported to provide a rotatable cylinder, adjacent rod-turns being spaced apart by a distance less than the diameter of the objects to be conveyed so that, although such objects will be exposed to the action of apparatus located outside the cylinder, they will not fall through the space between turns of the helix. As such a cylinder is rotated objects within it are caused to move axially as the result of the helical inclination of the rods forming the cylinder. In the case of the patent referred to, which discloses a tomato washing and peeling machine, washing and scrubbing apparatus is located within the cylinder near the entrance thereof. The peeling apparatus, consisting of a plurality of pairs of co-operating rollers, is located beneath the cylinder near its discharge end, and operates on the tomatoes exposed in the spaces between adjacent turns of the rod or rods from which the cylinder is formed.

A conveyer formed of rigid helically-wound rods has been found in practice to possess certain disadvantages among which are the fact that the tomatoes, after being partially peeled, slide without tumbling along the rods, and the fact that different sizes of tomatoes project to different distances from the cylinder through spaces between adjacent rod-turns. A further disadvantage of such a conveyer is that if the rods are made large enough to impart sufficient rigidity to the cylinder the tomatoes may be held from engagement with the peeling apparatus outside the cylinder. It is the object of my invention to overcome such disadvantages and to provide a cylinder which will cause more effective tumbling of the tomatoes, in which the effect of variations in the size of the tomatoes will be lessened, and which will support the tomatoes close to apparatus beneath the cylinder.

In carrying out my invention in its preferred form, I form the cylinder of one or more open-wound rods, similar to the cylinder of the patent above referred to, and I apply to those rods a covering of flexible material, such as rubber, which has on either one or both sides a relatively thin flange projecting toward the adjacent rod-turn. The tomatoes or other objects acted upon by the conveyer will be supported, at least in part, by these flanges, which are desirably made sufficiently flexible to yield under the weight imposed upon them. Those surfaces of the rod-covering which are directed inwardly of the cylinder are desirably roughened to increase the tumbling of the tomatoes.

The accompanying drawings illustrate my invention: Figs. 1 and 2 are a side and an end elevation respectively, of a machine in which my invention has been embodied; Fig. 3 is an axial section through a portion of the helical conveyer at a point near the bottom thereof; Fig. 4 is a view similar to Fig. 3, but illustrating a modified form of construction; and Fig. 5 is a fragmental side elevation of the conveyer, in partial section.

The machine illustrated in Figs. 1 and 2 is, except for the embodiment of my invention in the conveyer, essentially the machine described in detail in the aforesaid Patent No. 1,581,071. It comprises a frame 10 having at one end a receiving hopper 11 which discharges into the interior of a helical conveyer. The conveyer is formed by a plurality of open-wound helical rods 12 extending between ring gears 13 at opposite ends of the conveyer and supported at intermediate points by a supporting structure which comprises one or more rings 14 and axially extending members 15 disposed outside the cylinder and rotatable therewith. The cylinder is supported for rotation about a substantially horizontal axis, and is rotated by pinions 16 engaging the gears 13.

In the prior patent above referred to the scrubbing and spraying apparatus are shown disposed within the cylinder near the entrance end thereof; but as such apparatus forms no part of my present invention, I have not shown it in the drawings accompanying this application. Such apparatus serves to scrub and clean the tomatoes and to crack and loosen the skins thereon, the peeling of such skins from such tomatoes being effected by a plurality of pairs of rolls 18 disposed on transverse axes beneath the cylinder near the discharge end thereof. As will be clear from Figs. 3 and 4, the two rolls of each pair rotate in opposite directions and approximately in contact with each other so as to pinch between them and pull the cracked skins from the tomatoes.

In Figs. 3 and 5 I have shown the rods 12 as provided with coverings, each of such coverings having a central portion embracing the rod and a pair of oppositely directed flanges 21. These flanges are desirably located outwardly (relative to the cylinder) beyond the axis of the rod, and project axially of the cylinder from the rod toward the adjacent rod-turn. As shown, the flanges 21 are helically continuous; but above the rolls 18, it is not necessary for the flanges to be continuous, as the rolls will support any tomatoes temporarily dropping on to them through any gaps in the flanges. The rod coverings 20 are conveniently formed of relatively soft rubber, cored for the reception of the rod, and provided with slots 22 which can be spread to permit entrance of the rod into the central cored portion of the cover. If desired, the coverings may be cemented in place.

In prior Patent No. 1,581,071, the tomatoes were supported on the rods, and the adjacent rod-turns therefore had to be spaced close enough together to prevent the smallest tomatoes from falling through between them. With my invention the flanges 21 narrow the space through which tomatoes could fall and adjacent turns of the rod or rods 12 are therefore spaced farther apart than they were in the device of the prior patent.

As will be apparent from Fig. 3, I contemplate that the flanges 21 may be made sufficiently flexible to yield under the weight of tomatoes which they support. Because of their larger radius of curvature, larger tomatoes will tend to project through the gap between adjacent flanges 21 to an extent less than will smaller tomatoes; but larger tomatoes, being heavier, will deflect the flanges 21 downwardly to a greater extent than will smaller tomatoes. As a result, variation in the size of the tomatoes will have little effect on the manner in which they co-operate with the peeling rolls 18.

In the arrangement illustrated in Fig. 4, the rod-covering 25 is similar to the covering illustrated in Fig. 3, but has only one of the flanges 21 instead of two. While I prefer to employ the double-flange rod-covering as illustrated in Fig. 3, certain of the advantages of my invention can be obtained with a covering having a single flange, as shown in Fig. 4.

I find that the peeled portions of the tomatoes will not tend to slide along a rubber rod-covering as readily as they will along a bare metal rod. Because of this, the presence of the covering 20 or 25 increases the tumbling action of the tomatoes and lessens the probability that any tomato will be discharged from the cylinder without all portions of its outer surface having been brought into association with the peeling rollers 18. Further to improve the tumbling action, the surface of the rod-covering may be roughened. In the drawings, I have shown this roughening as being obtained by the provision of ribs 27 which project axially outwardly from the center portion of the rod-covering toward the free edges of the flanges thereon. While this method of roughening the inner surface of the flanges to secure a better tumbling action is preferred, it is obvious that other expedients may be employed for the same purpose.

I claim as my invention:

1. In a machine for peeling fruits or vegetables, a rotatable cylinder through which pass the products to be peeled, one or more pairs of peeling rolls located beneath said cylinder, said cylinder comprising one or more helically wound rigid rods, and a covering of flexible material on each of said rods, said covering embodying flexible flanges projecting from the associated rod in opposite directions toward adjacent rod-turns, the free-edges of adjacent flanges being spaced apart axially of the cylinder.

2. In a machine for peeling fruits or vegetables, a rotatable cylinder through which pass the products to be peeled, one or more pairs of peeling rolls located beneath said cylinder, said cylinder comprising one or more helically wound rigid rods, and a covering of flexible material on each of said rods, said covering embodying a flexible flange projecting from the associated rod axially of the cylinder toward an adjacent rod-turn and having its free edge spaced therefrom.

3. In a machine for peeling fruits or vegetables, a rotatable cylinder through which pass the products to be peeled, one or more pairs of peeling rolls located beneath said cylinder, said cylinder being provided above said rolls with a circumferentially extending slot, and a flange of flexible material projecting axially of the cylinder from one side of said slot toward the opposite side thereof.

4. In a machine for treating fruits or vegetables, a rotatable cylinder through which pass the products to be treated, treating mechanism disposed beneath said cylinder, said cylinder comprising a helically wound rod defining at least one side of a slot extending helically of the cylinder through which slot the products within the cylinder are exposed to the action of the treating mechanism, said rod being provided with a flange materially thinner radially than said rod and spaced outwardly, with reference to the cylinder, from the axis of the rod, said flange projecting laterally of the rod and axially of the cylinder toward the opposite side of said slot.

5. A rotatable cylindrical conveyer for fruits and vegetables, said conveyer comprising a helically wound rod defining at least one side of a slot extending helically of the cylindrical conveyer wall, and a covering of flexible material applied to said rod and having a flange projecting laterally of the rod and axially of said cylinder toward the opposite side of said slot.

6. The invention set forth in claim 5 with the addition that said flange is helically continuous.

7. The invention set forth in claim 4 with the addition that said flange is helically continuous.

MARK W. LOWE.